Figure 3:
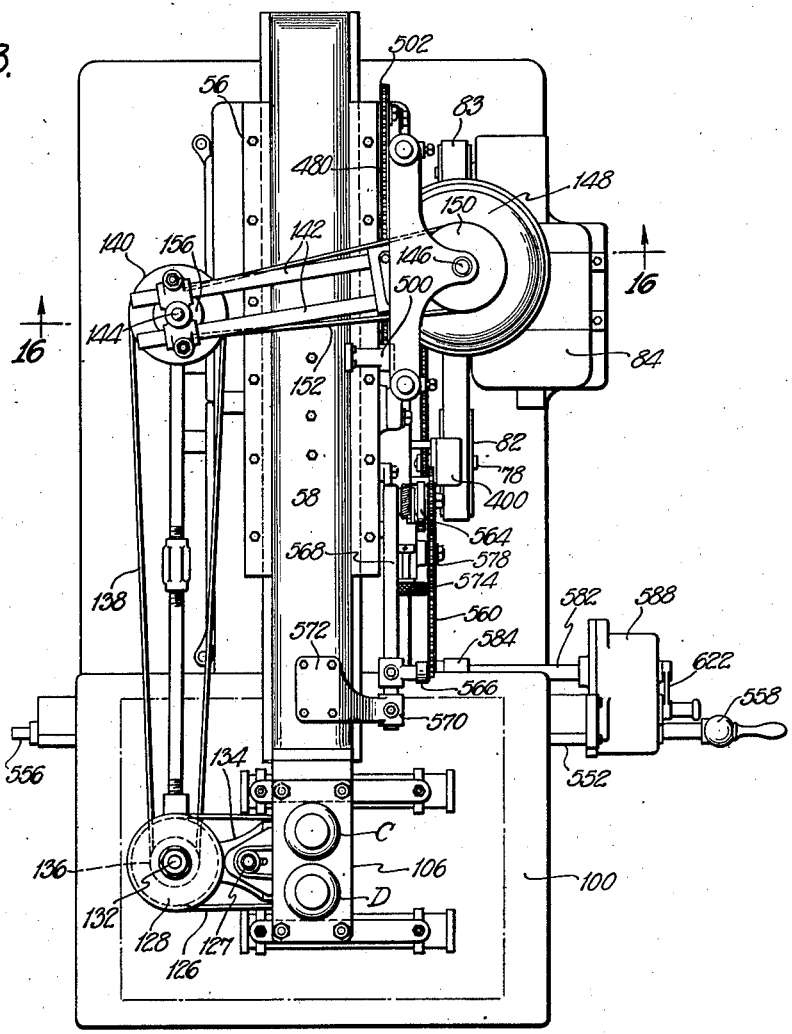

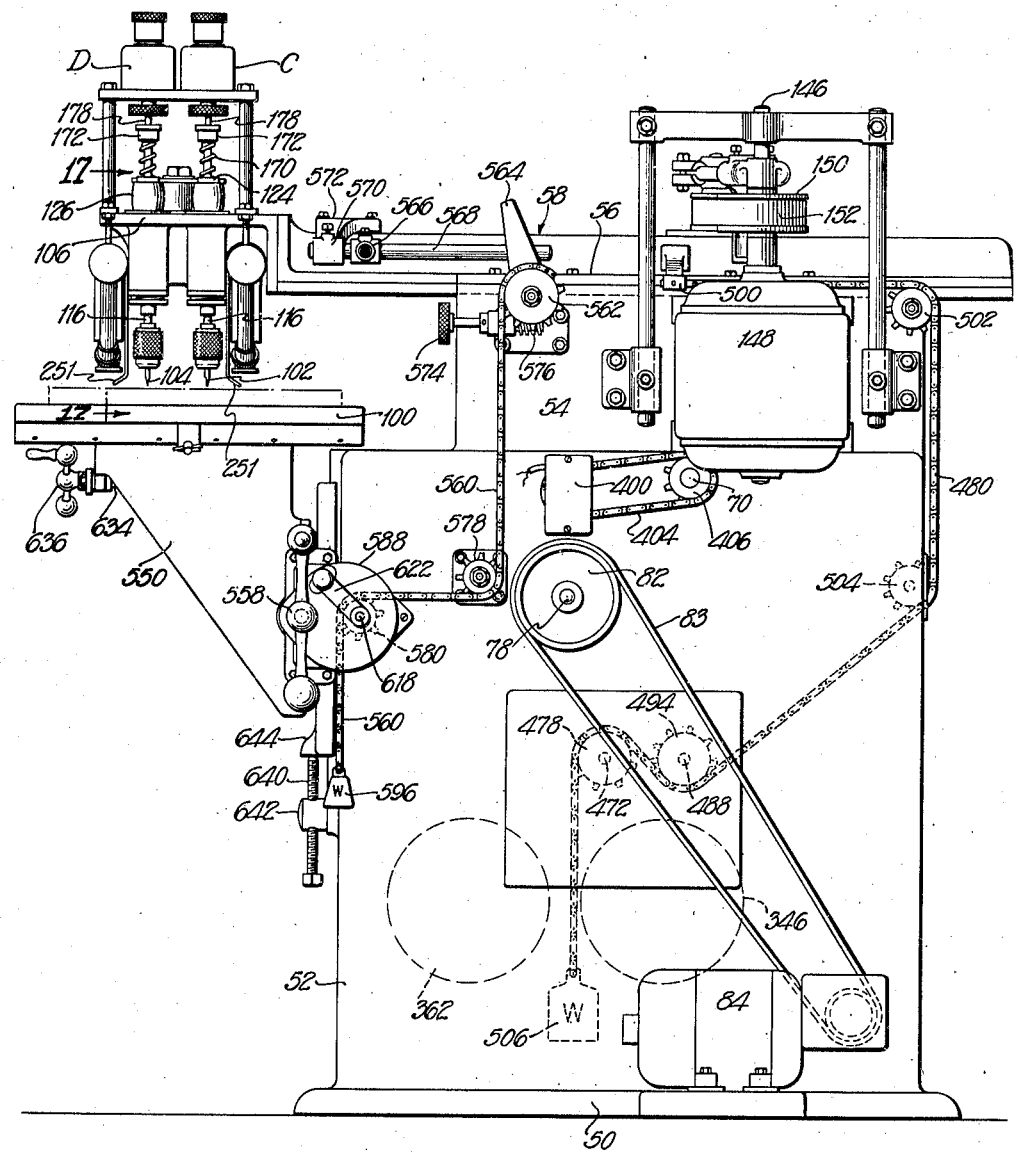
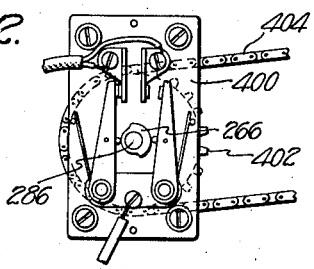

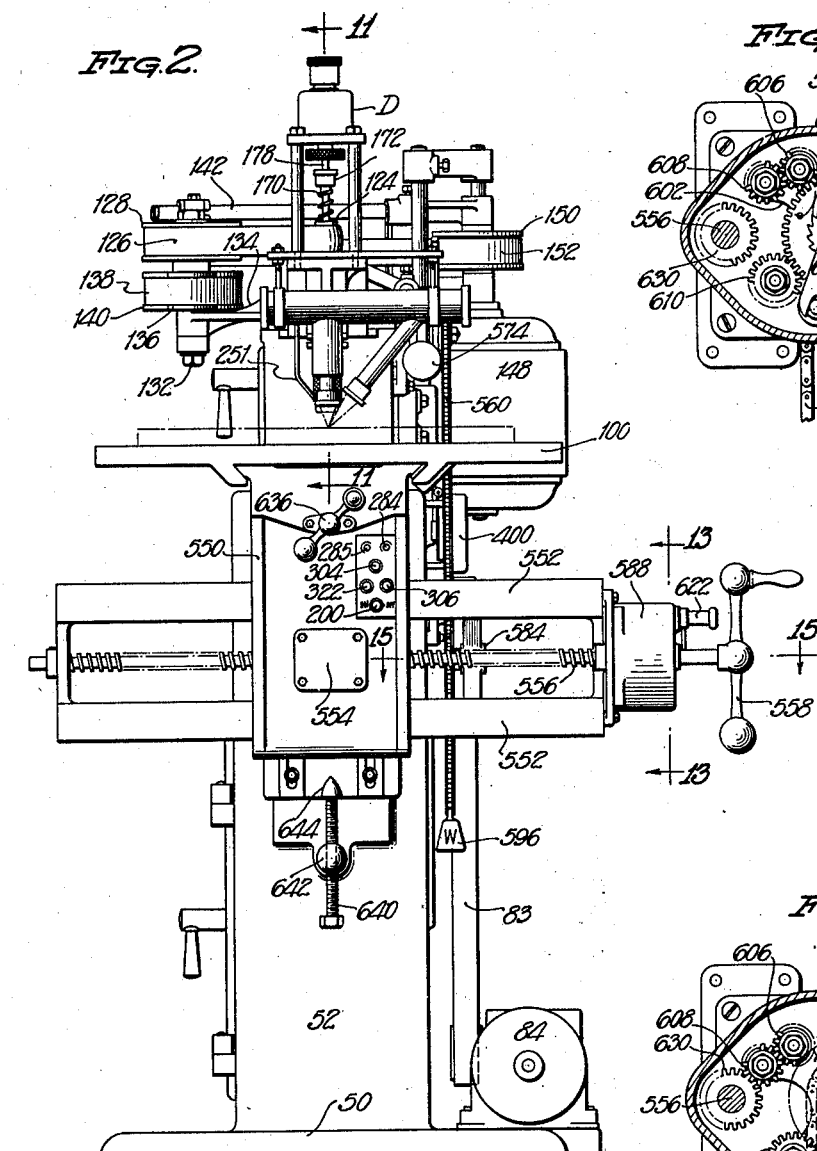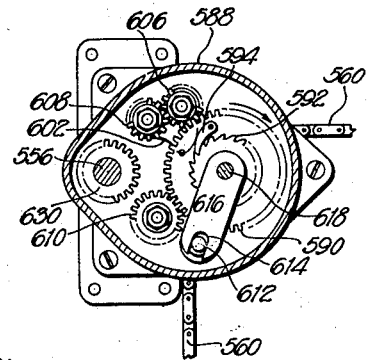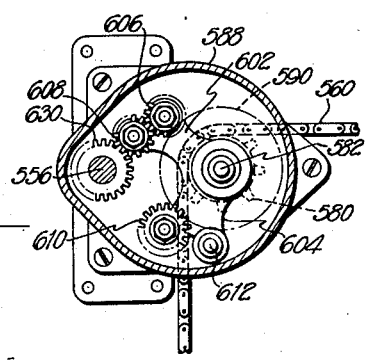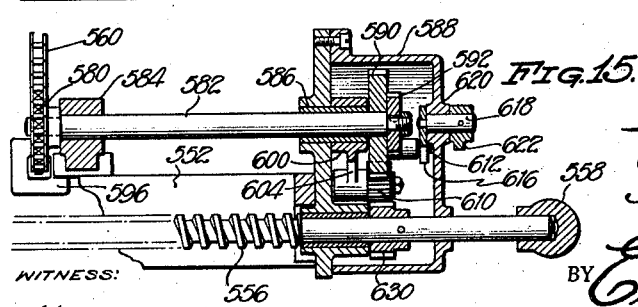

April 11, 1939. J. SHILKOFF ET AL 2,154,252
ENGRAVING OR ROUTING MACHINE
Filed Aug. 4, 1936 8 Sheets-Sheet 3

CLARENCE P. WOOD
JACOB SHILKOFF.
INVENTORS.

BY Ely Pattison
ATTORNEYS.

April 11, 1939.   J. SHILKOFF ET AL   2,154,252
ENGRAVING OR ROUTING MACHINE
Filed Aug. 4, 1936   8 Sheets-Sheet 4
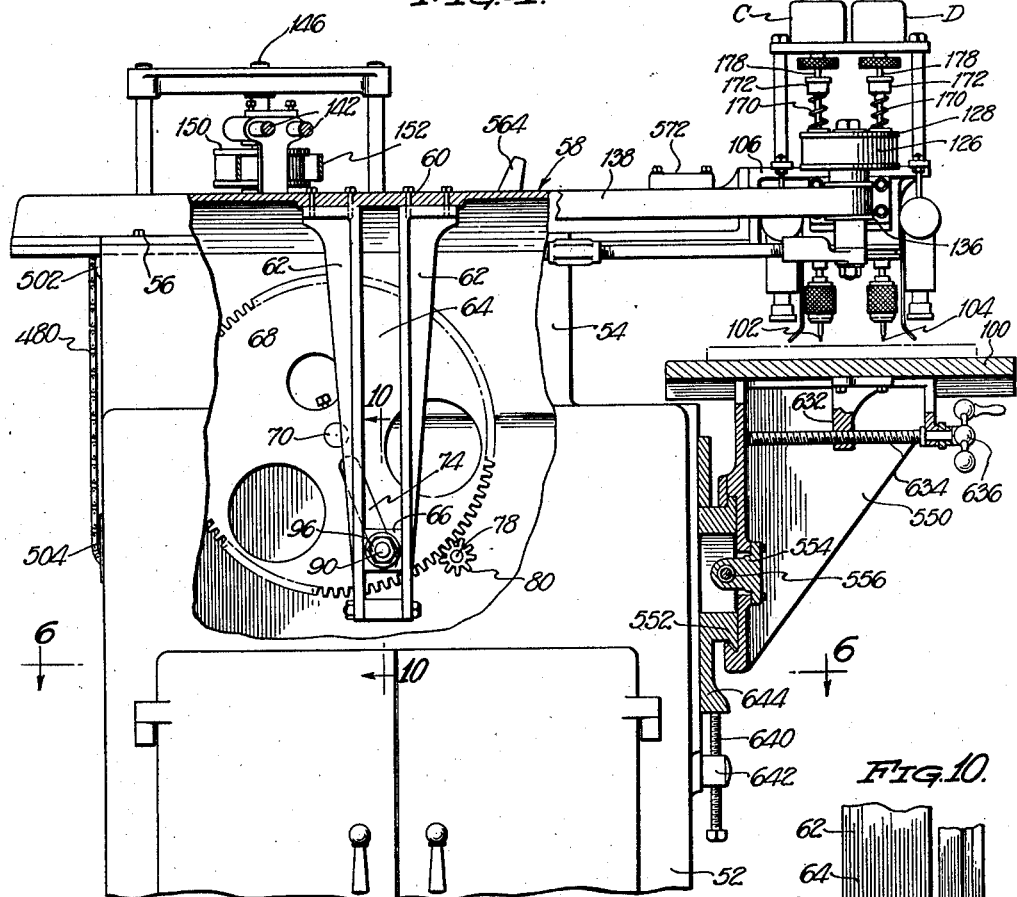
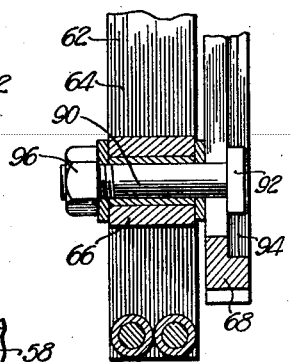
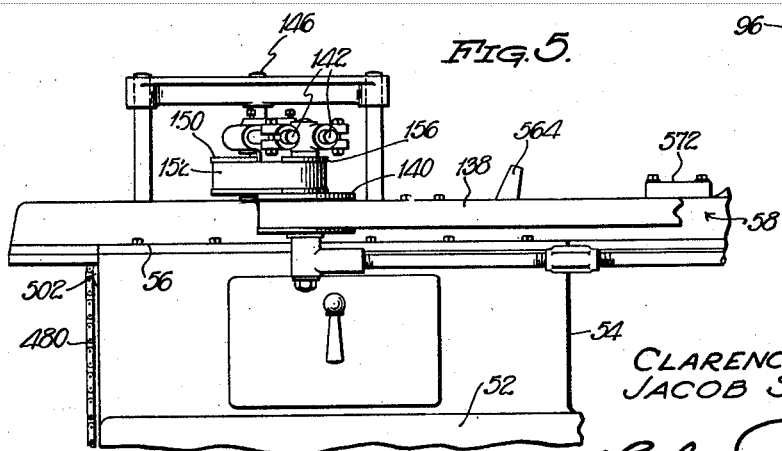
CLARENCE P. WOOD
JACOB SHILKOFF.
INVENTORS.
BY Ely Pattison
ATTORNEYS.

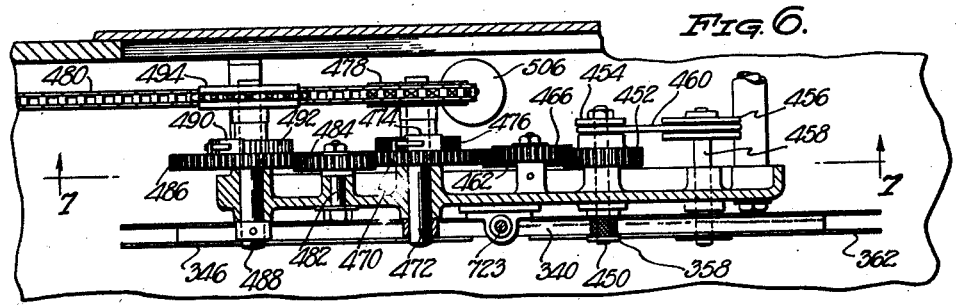
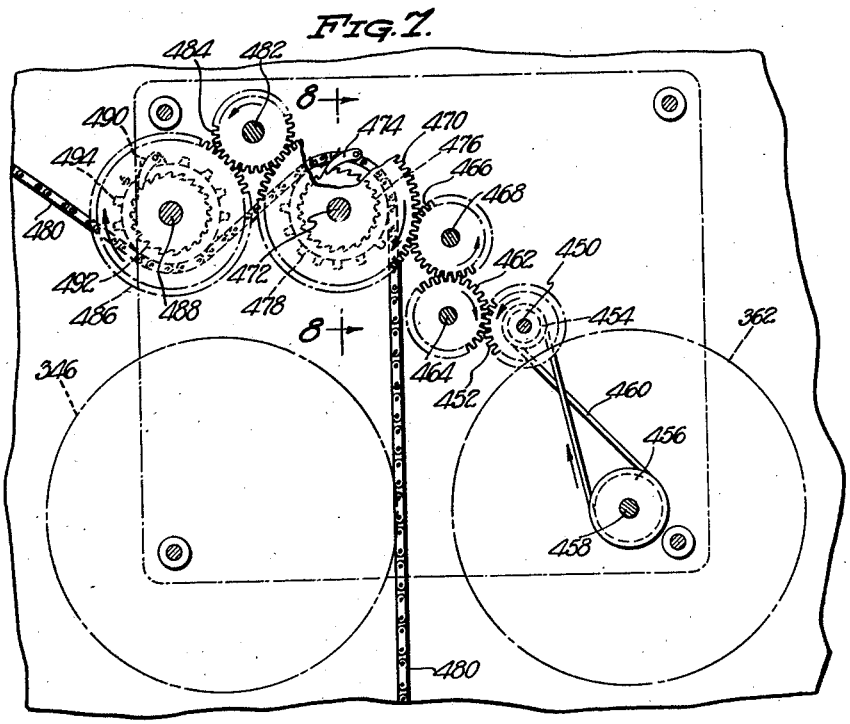
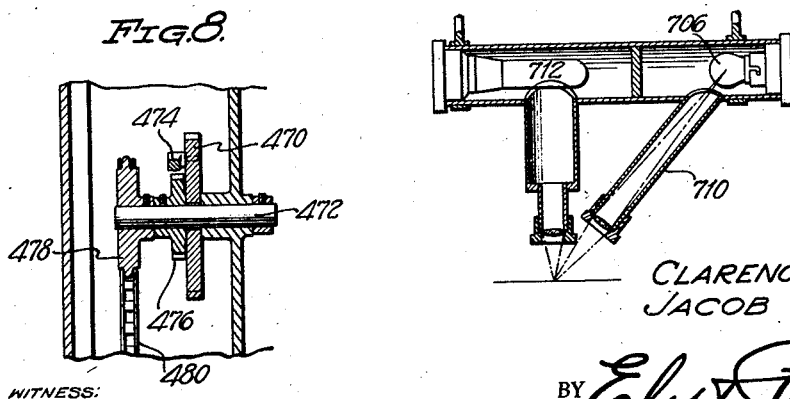
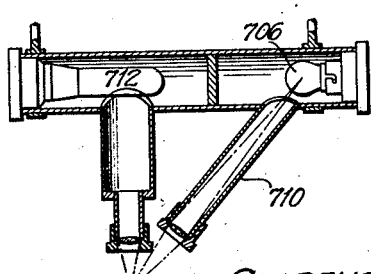
CLARENCE P. WOOD
JACOB SHILKOFF.
INVENTORS.

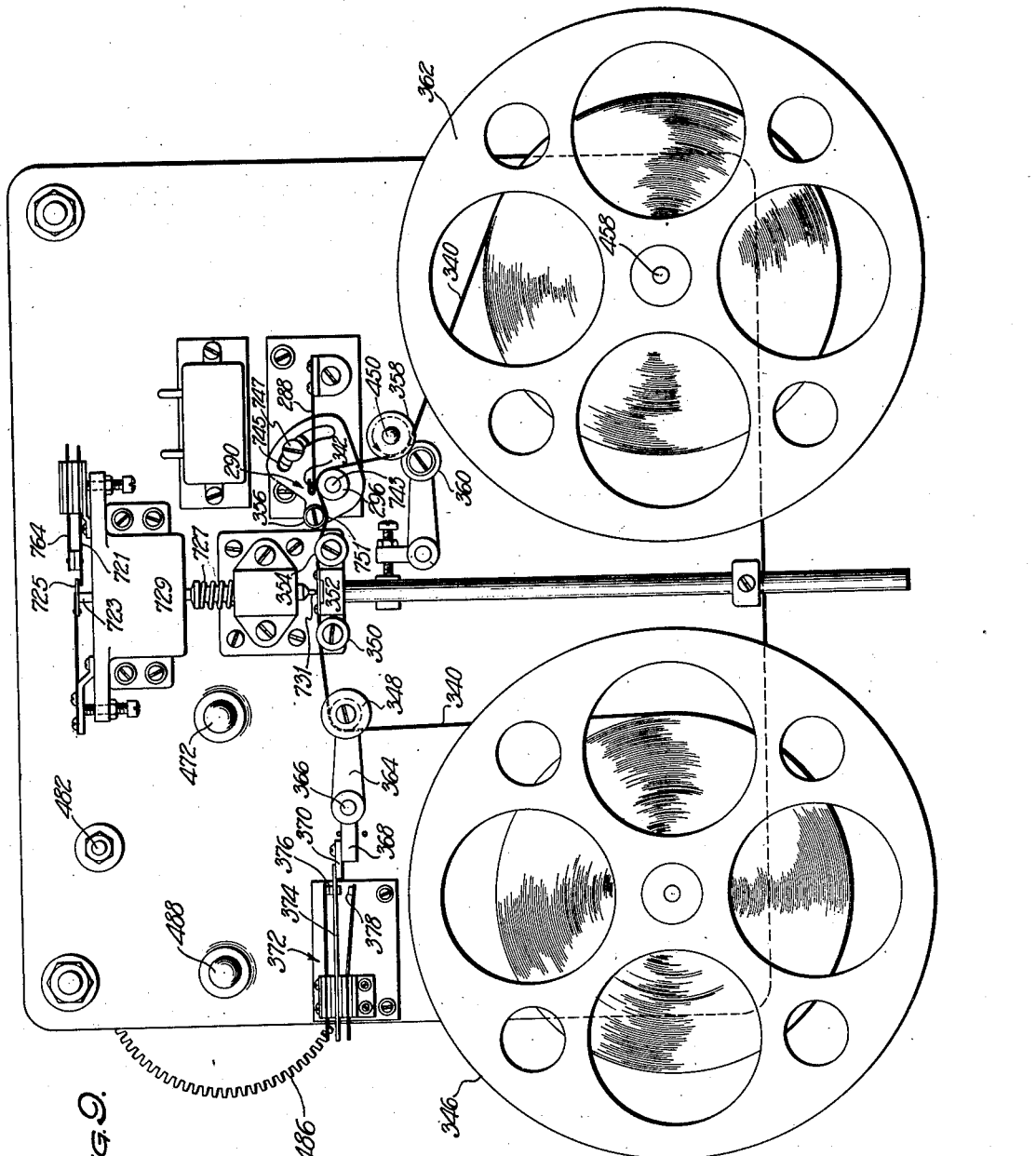

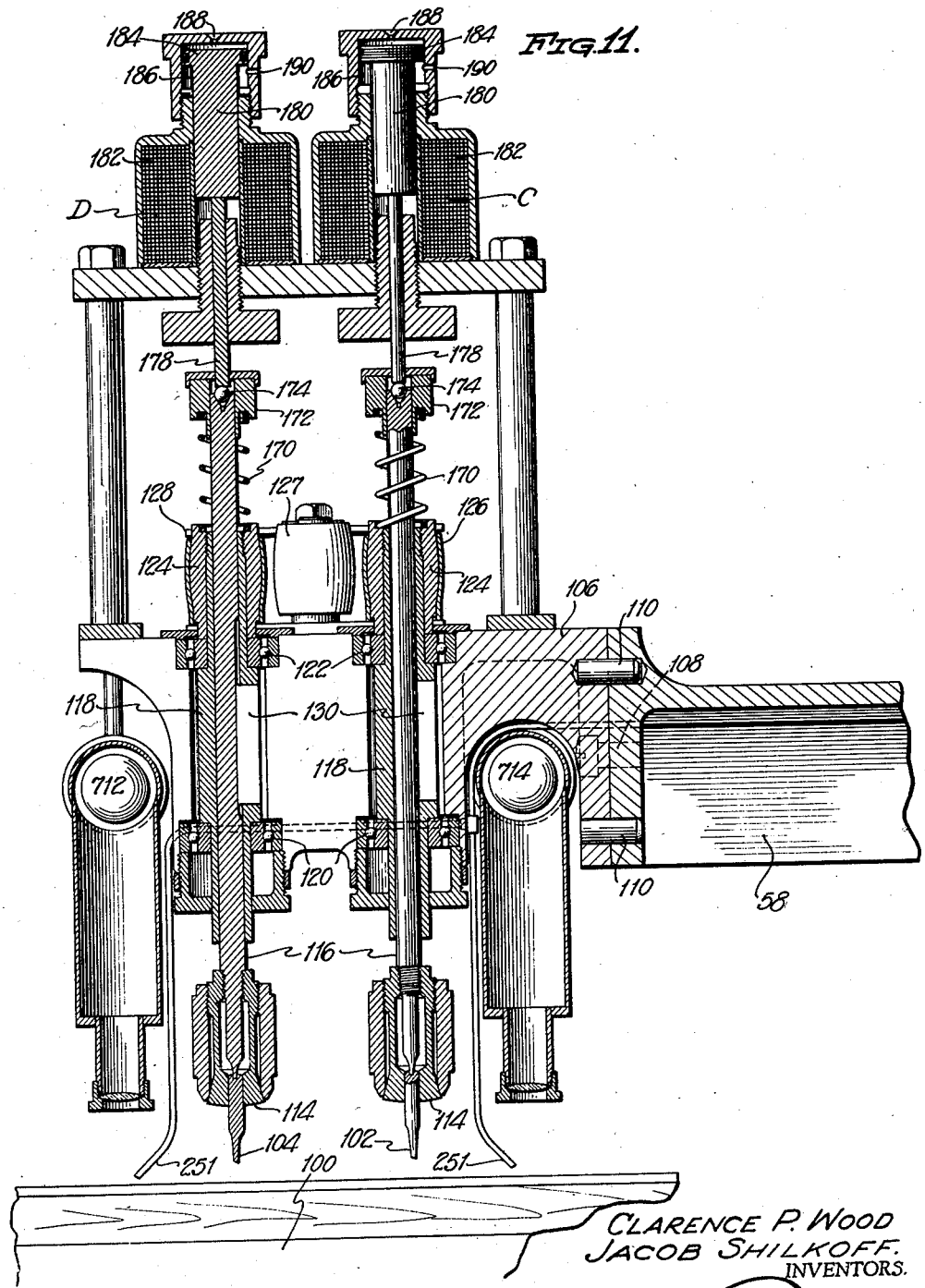

April 11, 1939. J. SHILKOFF ET AL 2,154,252
ENGRAVING OR ROUTING MACHINE
Filed Aug. 4, 1936   3 Sheets-Sheet 3

CLARENCE P. WOOD
JACOB SHILKOFF.
INVENTORS.

BY Ely Pattison
ATTORNEYS.

WITNESS:

Patented Apr. 11, 1939

2,154,252

UNITED STATES PATENT OFFICE 2,154,252

ENGRAVING OR ROUTING MACHINE

Jacob Shilkoff, New York, N. Y., and Clarence P. Wood, Monmouth Beach, N. J.; said Wood assignor to said Shilkoff Application August 4, 1936, Serial No. 94,188

19 Claims. (Cl. 90—13.5)

This invention relates to new and useful improvements in machines for routing and engraving of the general type disclosed in my prior Patent No. 1,991,963, granted to me February 19, 1935, and while it has many uses, it is particularly adapted for the preparation of printing plates.

One object of the present invention is to improve the construction and mode of operation of this type of machine and to provide such machine with mechanism which will effect a better and more efficient engraving or routing operation than prior machines.

A feature of the invention resides in the provision in a machine of the character above outlined, of a plurality of engraving tools or cutters which are adapted for alternate or simultaneous operation.

A further feature of the invention resides in the provision of means whereby the tools may be singly or simultaneously automatically engaged and disengaged with the work upon which they operate.

Still another feature of the invention resides in the provision of light sensitive means and a novel mechanism whereby the light sensitive means determines the operation of the tools.

I am aware that machines of this general type have been heretofore controlled by light sensitive devices, but in all such machines with which I am familiar, accurate operation is not obtained for the main reason that the light responsive devices are not properly positioned with respect to the surface of the work being operated upon. It is well known that light responsive devices should be positioned at right angles to the surface by whose characteristics they are effected and in machines of this type, to obtain this result, the light responsive devices and the tools which they control have, to the best of my knowledge, not been positioned in this relation because to do so, the light responsive device would have to be placed in advance of the tools in spaced relation therewith. Such an arrangement would set the tools in operation or out of operation either too early or too late with the result that the engraving or routing could not be accurately formed.

It is a further feature of this invention to provide a timing mechanism operable in conjunction with the tools and their respective light sensitive devices in such a manner that there is a lapse of time between the moment when the light sensitive devices are effected by surface conditions upon the work being operated upon and the moment at which the tools are operatively engaged or disengaged with the work, thereby permitting of the proper positioning of the light sensitive devices relative to the surface by whose characteristics they are effected, to obtain the most efficient results.

It is still a further feature of the invention to provide means whereby the afore-mentioned timing mechanism may be adjusted since it may be desirable at times to vary, slightly at least, the positions of the light sensitive devices.

Other features of the invention relate to certain novel and improved constructions, arrangements and combinations of parts hereinafter described, and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

Figure 16:
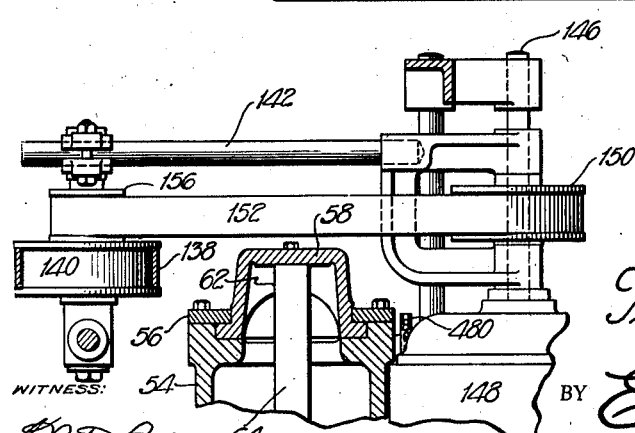
Figure 18:
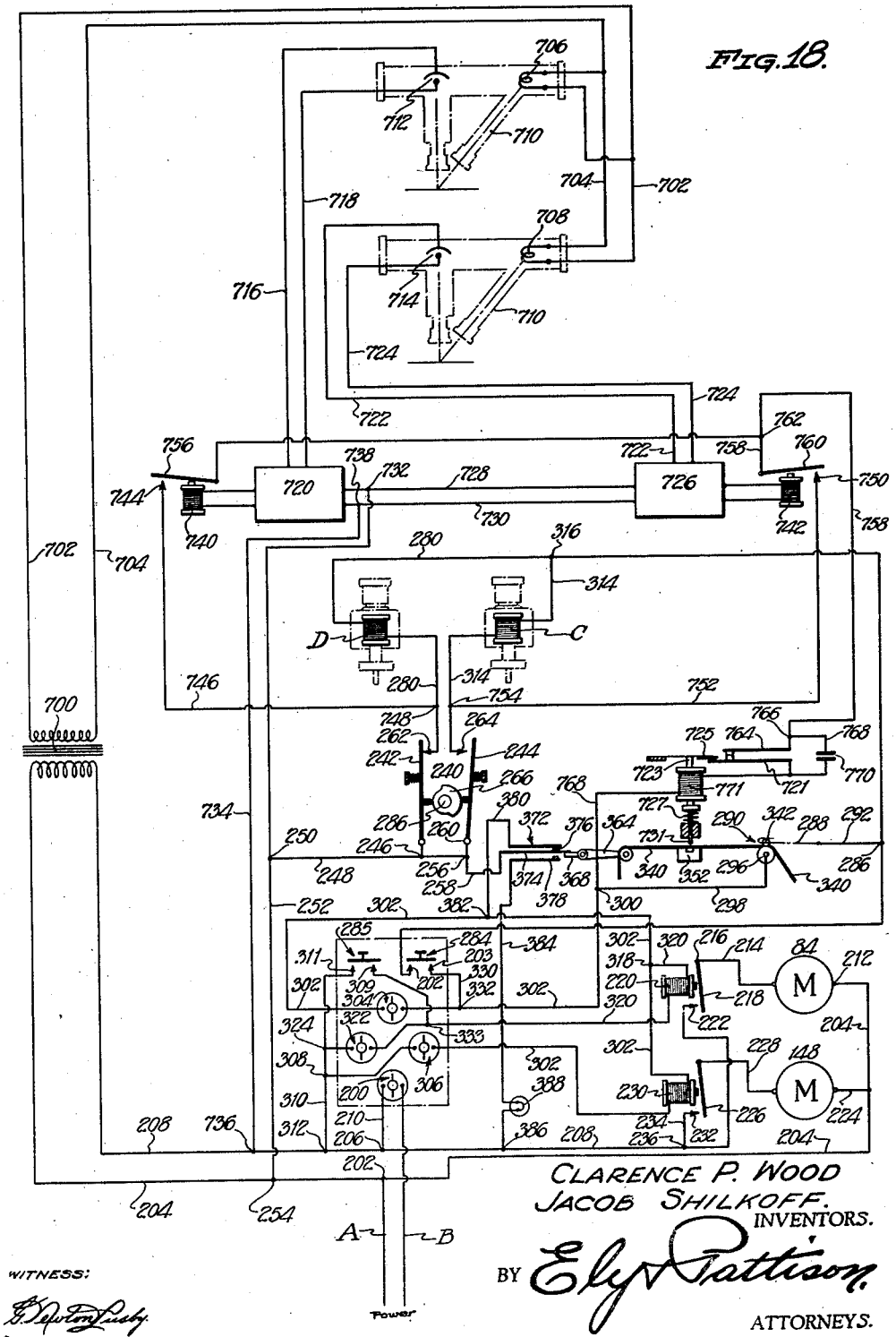

Figure 1 is a view in side elevation illustrating a machine embodying the present invention, Figure 2 is a view in front elevation of the machine, Figure 3 is a top plan view of the machine, Figure 4 is a fragmentary view partly in elevation and partly in section taken from the opposite side of the machine to that shown in Figure 1, Figure 5 is a fragmentary view in elevation of the opposite side of the machine to that shown in Figure 1, Figure 6 is a horizontal sectional view taken substantially on the line 6—6 of Figure 4, Figure 7 is a vertical sectional view taken substantially on the line 7—7 of Figure 6, Figure 8 is a detail vertical sectional view taken substantially on the line 8—8 of Figure 7, Figure 9 is a detail view in elevation of the timing mechanism, Figure 10 is an enlarged detail sectional view taken substantially on the line 10—10 of Figure 4, Figure 11 is a vertical sectional view on an enlarged scale taken substantially on the line 11—11 of Figure 2, Figure 12 is a detail view in elevation on an enlarged scale of a control mechanism employed in the machine, Figure 13 is a detail sectional view on an enlarged scale taken substantially on the line 13—13 of Figure 2, Figure 14 is a detail sectional view similar to Figure 13 with certain of the parts illustrated in Figure 13 removed and with other parts in a shifted position with relation to the position in which they are shown in said Figure 13, Figure 15 is a detail sectional view taken substantially on the line 15—15 of Figure 2, Figure 16 is a fragmentary sectional view on an enlarged scale taken substantially on the line 16—16 of Figure 3, Figure 17 is a detail sectional view on an enlarged scale taken substantially on the line 17—17 of Figure 1, and Figure 18 is a diagrammatic view of the electrical control system.

Referring to the drawings by reference character, one embodiment of the invention consists of a machine having a base 50 from which extends a main body portion 52 in the form of a housing. The housing has an extension 54 on its upper face and carried by the top wall of this extension 54 there are two guideways 56. The reference numeral 58 designates a ram which is slidably mounted in the guideways 56 and which is adapted for to and fro movement in said guideways 56.

As best illustrated in Figure 4, the ram 58 is preferably of hollow form and secured to its under face as at 60 there is a pair of spaced depending arms 62. These spaced depending arms 62 provide a space 64, and slidably mounted in said space there is a block 66. The reference numeral 68 designates a gear wheel suitably mounted in the housing 52 as at 70, and extending radially of said gear 68 there is a slot 74 in which said block 66 is adjustably mounted. Mounted upon a shaft 78 suitably mounted in the housing, there is a gear 80 which meshes with the gear 68 and serves to drive the same.

By this construction and arrangement of parts it will be apparent that as the gear 68 is rotated by the gear 80, the sliding block 66 and the spaced arms 62 cooperate to impart a to and fro movement to the ram 58.

As best illustrated in Figure 1 the shaft 78 is provided with a driving pulley 82 which, in the present embodiment of the invention, is driven by a belt 83 from a motor 84 suitably mounted upon the base 50 of the machine.

By the construction herein described it will be apparent that by adjustment of the block 66 relative to the slot 74 of the gear 68, the extent of reciprocating motion imparted to the ram 58 may be determined since, when the block 66 is at the extreme outer end of the slot 74, the block will impart a stroke of greater length to the ram 58 than when the block 66 is adjusted to a point intermediate of the ends, or at the extreme inner end of the slot 74.

The means by which the adjustment of the block may be obtained is illustrated in Figure 10, and it comprises a bolt 90 having a head 92 slidable in guideways 94 in the gear 68, the body of the bolt extending through the slot 74 in said gear. The block 66 is carried by the bolt 90 and is secured thereon by a nut 96. Thus, to adjust the block 66 relative to the slot 74 it is only necessary to loosen the nut 96 and slide the bolt 90 along the slot 74 to the desired position, in which position it may be retained merely by tightening the nut 96 upon the bolt 90.

The reference numeral 100 designates a work supporting bed, and movable to and fro over said work supporting bed by the ram 58, there is preferably a plurality of engraving or routing tools of which, in the present illustration there are two designated 102 and 104. These tools are mounted upon the outer end of the ram 58 and are carried by a suitable block 106 which is secured to the end of the ram by suitable cap screws or bolts 108 and properly positioned thereon by suitable positioning pins preferably in the form of dowels 110. Thus, as the ram 58 is moved to and fro, as heretofore described, the tools will be moved in a to and fro direction across the work supporting bed 100.

As best illustrated in Figure 11, these engraving tools are of substantially the same construction and the description of one will, therefore, suffice. The tool is carried by a suitable chuck 114, which chuck is mounted upon the lower end of a spindle 116. The spindle is surrounded by a sleeve 118, and the sleeve is mounted at its lower end in a bearing 120, and at its upper end in a bearing 122, and carried by the sleeve 118 there is a driving pulley 124.

Passing around these driving pulleys, as best illustrated in Figure 3, there is a belt 126 which also passes around an idle pulley 127 and a driving pulley 128. The sleeves 118 are each splined to its respective spindle by means of keys 130 whereby both spindles will be continuously driven at all times during the driving of the pulley 128. The driving pulley 128 is mounted on a shaft 132 carried by a suitable bracket 134 which projects from the block 106, heretofore mentioned, and carried by the lower end of said shaft there is a pulley 136 around which passes a belt 138, which belt also passes around a pulley 140. This pulley 140 is carried by a bearing 144 which is slidably mounted between the two arms 142 of a suitable bracket extending from the motor shaft 146 of a motor 148. The motor 148 is provided with a driving pulley 150 and a belt 152 passes around this driving pulley 150 and also around a pulley 156 mounted upon the shaft 144, heretofore mentioned.

Thus it will be apparent that, as the motor 148 is operated through the medium of the pulley 150, belt 152, pulley 156, shaft 144, pulley 140, driving belt 138, pulley 136, pulley 128, and driving belt 126, the pulleys 124 will be driven to drive their respective spindle 116 through the medium of their respective sleeve 118 and the keys 130.

Surrounding the upper end of each spindle and engaging the upper end of its respective pulley 124, there is a coil spring 170, and the upper end of said coil spring 170 engages a thrust member 172 carried by the upper end of its respective spindle. The spring 170 is adapted normally to maintain its respective tool out of operative engagement with a piece of work carried by the work supporting bed by reason of the upward thrust exerted thereby against the thrust member 172. A roller bearing 174 is carried by the upper end of each of the spindles and having engagement with said roller bearing, there is a member 178 carried by the armature 180 of a solenoid 182. The upper end of the solenoid 182 is provided with a piston head 184 operating in a housing 186 and the housing has vent or bleed openings 188 and 190, which construction serves as a movement retarding device for the solenoid 180, as will be hereinafter more specifically explained.

The solenoids 182 are adapted when energized, to project their armatures downwardly in Figure 11 and thus force their respective tools into operative engagement with a piece of work mounted upon the work supporting bed, it being understood that the solenoids are of sufficient strength to overcome the force exerted by the springs 170.

and to compress them sufficiently to permit of the necessary movement of the tool into operative engagement with the work.

By this construction and arrangement of parts it will be obvious that the springs 170 normally hold their respective tool out of engagement with the work on the bed until such time as either of the solenoids may be energized. At this point the solenoid energized will overcome its corresponding spring 170 and will force its respective tool into operative engagement with the work. Immediately the solenoid is de-energized the spring 170 will again move the tool out of operative engagement with the work.

In the machine herein illustrated the tools 102 and 104 are adapted alternately to engage the work in opposite directions of movement of the ram. For example, when the ram 58 moves to the left in Figure 1, which movement I will hereinafter term the forward movement, the tool 104 will be operatively engaged with the work, and when the ram moves to the right in said figure, which movement I will hereinafter term the inward movement, the tool 102 will be operatively engaged with the work.

The foregoing operation is obtained by alternately energizing and de-energizing the solenoids 182, and I will now describe both the manner in which the solenoids 182 are energized to operate their respective tools and the manner in which the automatic energization of one solenoid and the de-energization of the other solenoid is accomplished both simultaneously and alternately.

The main power line has two legs A and B, see Figure 18. The leg B of the power line leads directly into a manually operated switch 200, the leg A being connected as at 202 to an electrical conductor 204. Leading from the switch 200, and connected as at 206 to a conductor 208, there is a conductor 210. The conductor 204 is connected as at 212 to the motor 84, and leading from the motor 84, there is a conductor 214, which is connected as at 216 to a switch lever 218 controlled by a relay 220. The switch lever 218 is adapted when closed to engage at 222, the conductor 208 and thus, when the manually operated switch 200 and the relay switch 218 are closed, the circuit to the motor 84 will be completed.

Leading from the conductor 204 to the motor 84 there is a conductor 224 and leading from the motor 148 to a switch lever 226, there is a conductor 228. The switch lever 226 is controlled by a relay 230 and is adapted when closed to engage at 232, with a conductor 234, which in turn is connected as at 236 to the conductor 208. Thus, as the manually operated switch 200 and the relay switch 226 are closed, the circuit to the motor 184 will be completed.

From the foregoing it will be apparent that when the switch 200 is closed, power is introduced into the machine although the motors 84 and 148 do not necessarily operate merely upon the closing of the switch 200, since their respective relay switches must be closed in order for them to be set in operation.

The reference numeral 240 designates a double throw switch and it includes two spring actuated switch levers 242 and 244. The switch lever 242 is connected as at 246 with a conductor 248 which is connected as at 250 with a conductor 252 which, in turn is connected as at 254 with the conductor 204. The other end of the conductor 248 is connected as at 256 to a conductor 258, one end of which is connected as at 260, to the switch lever 240, heretofore mentioned.

The switch lever 242 is adapted for engagement with a switch terminal 262, while the switch lever 244 is adapted for engagement with a switch terminal 264, and these switch levers are adapted to be moved alternately into and out of engagement with their respective switch terminals 262 and 264 by means of a rotating cam 266 carried by a shaft 286, see Figure 18.

For the sake of clearness, I will designate the solenoids 182, heretofore referred to, as C and D, the solenoid C being the one associated with the tool 102, the solenoid D being the one associated with the tool 104.

Leading from the terminal 262 of switch 240, through the solenoid D, there is a conductor 280, and this conductor 280 is connected as at 282 to the terminal 284 of a manually operated switch 284. Connected to the conductor 280 as at 286 and leading to the spring contact arm 288 of a switch 290, see Figure 9, there is a conductor 292. The spring contact arm 292 is adapted to intermittently engage a roller 296 from which leads a conductor 298 which is connected as at 300 to a conductor 302. The conductor 302 leads through a manually operated switch 304, through the relay 230, through a manually operated switch 306, and is connected as at 308 to a conductor 310 which in turn is connected at one end as at 312, to the conductor 208, the opposite end of said conductor 310 being connected to the terminal 311 of a manually operated switch 285. Leading from the terminal 264 of the switch 240, through the solenoid C, there is a conductor 314 which is connected as at 316 to the conductor 280, and connected as at 318 to the conductor 302, there is a conductor 320 which passes through the relay 220, a manually operated switch 322, and is connected as at 324 to the conductor 310. Leading from the terminal 203 of the switch 284 there is a conductor 330 which is connected as at 322 to the conductor 302, and leading from the terminal 309 of the switch 285 and connected to the conductor 320 as at 333, there is a conductor 336.

The spring arm 288 of the switch 290 is maintained normally out of engagement with the roller 296 by a tape 340. This tape 340 is provided at intervals with openings and is fed by a suitable mechanism to be hereinafter described, between the spring arm 288 and the roller 296 of the switch 290 in such a manner that as the openings in the tape pass beneath the spring arm 288, its contact member, which is herein illustrated as a ball 342, see Figure 18, will engage the roller 296 and make electrical contact therewith, this electrical contact being broken when an unperforated portion of the tape 340 occupies a position between the spring arm 288 and the roller 296.

As best illustrated in Figure 9, the tape 340 is carried by a reel 346 from which it is fed over a roller 348, roller 350, anvil 352, roller 354, roller 356, the roller 296 heretofore mentioned, between two rollers 358 and 360 onto a reel 362. The roller 348 is carried by an arm 364 which is pivotally mounted as at 366 and has an extension 368 which carries a nose piece 370. The tension of the tape 340 is adapted normally to hold the pivoted arm in substantially a horizontal position as shown in Figures 9 and 18, and when in this position, the nose 368 will retain a resilient switch arm 374 of a switch 372, in electrical engagement with the terminal 376 of said switch and will retain said switch arm under tension. Should the tape 340 break, however, or become unduly slack, the tension thereon would be relieved and the spring switch arm thereby permitted to disengage the terminal 376 and move into engagement with the terminal 378 of the switch 372.

As best illustrated in Figure 18, the spring contact member is electrically connected to the conductor 258. The terminal 376 is electrically connected with a conductor 380 which is connected as at 382 with the conductor 302, and the terminal 378 is electrically connected with a conductor 284 which is connected as at 386 with the conductor 208. This conductor 384 has interposed therein a signal 388 which is herein illustrated as a lamp, but which may as well be an audible signal or a combination of audible and visual signal as desired.

In the diagram illustrated in Figure 18, all of the switches are open except that the spring arm 242 is in engagement with the terminal 262 of the switch 240 and the spring switch arm 374 is in engagement with the terminal 262 of the switch 240 and the spring switch arm 374 is in engagement with the terminal 376 of the switch 372.

With the several parts in the position shown in Figure 18, the machine is at rest. To set the machine in operation, the switch 200 is preferably first moved to closed position. Closing of the switch 200 completes the circuit to supply power to the conductors 204 and 208. The motor 84 which, through the medium of the belt 83, drives the shaft 78 to drive the gear 80 and the gear 68, is preferably next set in operation, and this is accomplished by closing the switch 322. Closing the switch 322 completes a circuit as follows: Conductor 208, conductor 310, switch 322, conductor 320, relay 220, conductor 302, conductor 380, terminal 376 of switch 372, spring switch arm 374 of switch 372, conductor 258, conductor 248, and conductor 252 to conductor 204. This circuit energizes relay 220 and operates the switch arm 218, moving it into electrical contact with the terminal 222, completing a circuit as follows: conductor 204, motor 84, conductor 214, switch arm 218, terminal 222, and conductor 208, which circuit will set in operation the motor 84, whereupon, through the medium of the driving chain heretofore described, the ram 58 will begin to move in a to and fro motion over the work supporting bed.

The motor 148 is preferably the next to be set in operation, and this is accomplished in the following manner: The manually operated switch 306 is moved to closed position and the following circuit through the relay 230 is established from the point 312 of conductor 208, conductor 310, conductor 302, manually operated switch 306, conductor 302 through relay 230, conductor 380, terminal 376 of the switch 372, through said switch, conductor 258, conductor 248, to point 250 on conductor 252, and conductor 252 to point 254 on conductor 204. This circuit energizes the relay 230 and moves its switch lever into engagement with the terminal 232, thereby closing a circuit through conductor 204, conductor 224, motor 148, conductor 228, switch lever 226, switch terminal 232, and conductor 234, to conductor 208 and upon establishing this circuit, the motor 148 will begin to operate.

It will be noted that the circuits of the motors 84 and 148 are separate and independent of each other and while, in the foregoing, I have described the motor 84 which drives the machine as being the first to be set in operation, the motor 148 which drives the tools may, if desired, be placed in operation first.

As the motor 84 begins to operate, the ram 58 begins its to and fro movement, carrying the tools back and forth over the work supporting bed, the tools being given their rotary motion from the motor 148 and the driving chain heretofore described.

By reference to Figures 1 and 12, it will be noted that the shaft 286, which carries the cam 266, is mounted in a switch box 400 secured to the main body portion of the machine. To drive this shaft 286, it is provided with a sprocket 402, and passing around this sprocket 402 there is a driving chain 404 which also passes around a sprocket 406, operatively connected to the shaft 70. Thus, as the machine is operated, the cam 266 will be driven to cause the switch levers 242 and 244, alternately to engage their respective terminals alternately to close and open the circuits to the solenoids C and D, thereby to effect engagement and disengagement of the tools with the work dependent upon the direction of movement of the ram.

By reference to Figure 18 it will be noted that the ram 58 is on its outward movement and that the solenoid D is energized, holding the tool 104 in operative engagement with the work. The mechanism is so constructed that by the time the end of the outward stroke is reached, the high portion of the cam 266 will pass out of engagement with the switch lever 244 and permit of its engagement with the terminal 264, to energize the solenoid C, the high portion of the cam 266 simultaneously passing into engagement with the switch lever 242, moving it out of engagement with the terminal 262, thereby de-energizing the solenoid D. This operation causes movement of the tool 104 out of engagement with the work as the direction of movement of the ram reverses and the ram starts its inward movement.

It is to be understood, however, the two circuits just described are not complete during the entire time of operation of the ram since they are open at the switch 290 except when a perforation or opening in the tape 340 permits the roller 242 of the switch arm 288 to electrically engage the roller 296. For example, with the parts in the position in which they are illustrated in Figure 18, the circuit to the solenoid D is as follows: From the conductor 204, through conductor 252, conductor 248, switch arm 242, conductor 280, solenoid D, conductor 280, conductor 292, switch arm 288 of switch 290, roller 296, when an opening in the tape is presented between the rollers 342 and 296, conductor 298, conductor 302, switch 304, it being understood that this switch is closed, conductor 302, relay 230, to switch 306, to the point 308 on conductor 310 and thence to the conductor 208.

Thus it will be apparent that when the machine is being operated in the outward or forward direction, and there is the proper tension on the tape 340, that each time an opening in the tape 340 passes between the rollers 242 and 296, the solenoid D will be energized and the tool 104 caused to engage the work and that said tool will be caused to disengage the work when the armature D is de-energized which takes place when the unperforated portion of the tape passes between the rollers 242 and 296.

If from any cause during operation of the machine, slack should occur in the tape 340 at any point between the switch 290 and the reel 356, the arm 364 will, under the influence of the resilient switch arm 374, move upwardly. This upward movement of the arm 364 permits the resilient switch arm 374 to move out of engagement with the terminal 376, thus opening the circuits to the motors 84 and 148, and thereby stopping the machine and the tools. As the switch arm 374 moves out of engagement with the terminal 376, it engages the terminal 378 and establishes a circuit from the point 250 on conductor 252, conductor 248, conductor 258, resilient switch arm 374, terminal 378, conductor 384, signal 388 to the point 386 on conductor 208, which circuit operates the signal 388 to indicate that the machine has ceased to operate.

As heretofore stated, the tape 340 is fed from the reel 346 and is taken up on the reel 362, and the mechanism by which this is accomplished will now be described.

The roller 358, heretofore mentioned, see Figure 9, constitutes the means for pulling the tape 340 through the switch 290, and as best illustrated in Figure 7, this roller is carried by a shaft 450 upon which, and keyed thereto, there is a gear 452 and a belt pulley 454. Passing around the belt pulley 454 and a belt pulley 456, preferably keyed to the shaft 458 upon which the reel 362 is mounted, there is a crossed belt 460 which serves to drive the reel 362 to take up slack in the tape as it is fed through by the roller 358.

The gear 452 is driven in a counter-clockwise direction in Figure 7 by a gear 462, mounted on a shaft 464, and the gear 462 is in turn driven in a clockwise direction by a gear 466 mounted upon a shaft 468, the gear 466 being driven in a counter-clockwise direction by a gear 470. As best illustrated in Figure 8, the gear 470 is loosely mounted upon a shaft 472 and pivotally mounted upon the gear 470, there is a ratchet pawl 474. The ratchet pawl 474 is adapted for operative engagement with a ratchet wheel 476 keyed or otherwise operatively connected to the shaft 472. The shaft 472 is driven in both the counter-clockwise and clockwise direction by a sprocket wheel 478, keyed or otherwise operatively connected thereto, and around which passes a driving chain 480. Carried by a shaft 482 there is a gear 484 which meshes with the gear 470, heretofore mentioned, and which serves to drive said gear 470 in the clockwise direction. This gear 484 is driven in the counter-clockwise direction by means of a gear 486 which is loosely mounted upon a shaft 488 which gear carries a pawl 490. This pawl 490 cooperates with a ratchet wheel 492 operatively connected with the shaft 488. The reference numeral 494 designates a sprocket wheel which is operatively connected to the shaft 488 and the driving chain 480, heretofore mentioned, passes around this sprocket wheel 494.

The chain 480 is connected at one end to an arm 500 projecting laterally from the rear side of the ram 58. From this point the chain projects around idle sprockets 502 and 504, as illustrated in Figure 1, from whence it passes to the sprockets 494 and 478. The free end of the chain is provided with a weight 506 and this weight serves to drive the sprockets 478, since it serves to take up the slack in the chain when the ram is travelling on its inward movement. When the ram travels on its outward movement, however, the chain will serve to drive the sprocket wheel 494 at the same time elevating the weight 506. When the chain 480 is moving under the influence of the weight 506 or from left to right and down in Figure 7, rotation of the sprocket wheel 478 by the chain 480 causes the teeth of the ratchet wheel to engage the pawl 474 carried by the gear 470, thereby to drive the gear 470 of the gears 466, 462, and 452 in the manner heretofore described. When the chain is moved under the influence of the ram against the action of the weight or up and to the left in Figure 7, the teeth of the ratchet wheel 492 engage the pawl 490 and drive the gear 486 which, through the medium of the gear 484, drives the gear 470 of the remainder of the train, as heretofore described. Thus it will be apparent that as the ram is reciprocated through this operation, the reel 362 will be continuously driven in the proper direction to take up the slack of the tape as the same is pulled from the reel 346 by the roller 454, as heretofore described.

The work supporting bed 100 is adapted for sliding movement transversely of the machine in both directions in Figures 2 and 3. To accomplish this result, reference will be had to Figure 4, wherein the work supporting bed 100 is illustrated as carried by a bracket 550 slidably mounted upon a trackway 552 suitably carried by the frame of the machine. Extending from the bracket 550 there is an arm 554, and passing through said arm and having threaded engagement therewith, there is a threaded shaft 556. In Figures 2 and 15 this threaded shaft 556 is shown as provided with a handle 558, and it will be obvious that by rotation of this handle, the shaft 556 will be rotated and the work supporting bed 100 moved either to the right or to the left in Figures 2 and 15, depending upon the direction of rotation of the handle 558.

Means is provided for operating the threaded shaft 556 in either direction to move the work supporting bed in either direction, directly from the ram of the machine, and I will now proceed to describe this mechanism.

Referring to Figure 1, the reference numeral 560 designates a chain which passes around a sprocket 562 rotatably mounted on the frame of the machine. Operatively connected with this sprocket there is an upstanding arm 564 which is adapted for engagement by an abutment member 566 preferably in the form of an arm adjustably carried upon a rod 568 which in turn is mounted in a sleeve-like member 570 forming the end of an arm 572, which arm is carried by the ram 58. Thus, as the ram traverses its to and fro movement, the shaft 556 will rock the upstanding arm 564 and move the sprocket 562 in a clockwise direction in said Figure 1. The extent of rocking movement which is given to the arm 564 may obviously be determined by the adjustment of the abutment member 566 along the rod 568. The throw of the arm 564 may also be adjusted by turning the knurled wheel 574, which in turn operates a screw 576 to position the arm 564 either to the right or left of a vertical line in Figure 1. Obviously, when the arm 564 is adjusted to the left of this vertical line in said figure, the throw imparted to the arm 564 will be greater than if said arm is adjusted to the right of the vertical line in said figure, since, in the first described position, the abutment member 566 is moved into engagement with the arm 564 at an earlier moment than when the arm is moved to the second described position. The chain 560 passes around an idle sprocket 578 from whence it passes around a sprocket 580 which is mounted upon the end of a shaft 582 which in turn is mounted in suitable bearings 584 and 586. Carried upon the opposite end of this shaft 582 and within a housing 588 there is a gear 590. This gear 590 is loosely mounted upon the shaft 582 and closely adjacent this gear 590 there is a ratchet wheel 592 which, as shown in Figure 15, is keyed to a reduced end portion of said shaft 582. As shown in Figure 13, the gear 590 carries a pawl 594 which is held in resilient engagement with the teeth of the ratchet wheel 492 in such a manner that as the shaft 582 is moved by the chain 560 in the clockwise direction in Figure 13, one of the teeth of the ratchet wheel 592 will engage the pawl 594 and drive the gear 590 in the clockwise direction. The shaft 582 is moved in the clockwise direction by the chain 560 at a pre-determined point in the inward movement of the ram, this point being determined by the adjustment of the abutment member 566 and of the arm 564. Upon the outward stroke of the ram or when it moves to the left in Figure 1, the arm 564 swings to the left, rotating the sprocket 562 in the counter-clockwise direction. This is also true of the idle sprocket 578 and the sprocket 580. The movement of the arm 564 to the left and the clockwise movement imparted to the sprockets 562, 578, and 580 is occasioned by the presence of a weight 596 carried by the lower free end of the chain 560, which weight, it will be understood, will be sufficient to effect the operation described. The direction of feeding of the work supporting bed 100, whether right or left when the same is being driven from the machine, is determined by the following mechanism. Mounted for oscillating movement upon the shaft 562 there is a spider-like member 600 which has two arms 602 and 604. Carried by the arm 602 there are two gears 606 and 608, while carried by the arm 604 there is one gear 610 and a projecting pin 612. The projecting pin 612 is adapted to occupy a position in the notch 614 in the free end of a lever 616 which is fixed on the inner end of a stub shaft 618 mounted as at 620 in the housing 588. Carried by the stub shaft 618 there is an operating handle 622, and upon imparting a rocking movement to said handle 622, the member 616 may be rocked, and through the medium of the projecting pin 612 rock the spider 600.

When the spider 600 is rocked in such a manner that the gear 610 engages with a gear 630 upon the shaft 556, the gear 630 and the shaft 556 will be rotated in a clockwise direction in Figures 13 and 14. However, if the spider be moved in a counter-clockwise direction, the gear 610 will be disengaged with the gear 630 and the gear 608 will be moved into engagement with the gear 630. The gear 606 heretofore mentioned acts as an intermediate gear between the gear 602 and the gear 608 to reverse the direction of travel of the gear 608 as compared to the direction of travel of the gear 610, and thus, when the gear 608 has been moved into engagement with the gear 630, the gear 630 and the shaft 556 by which it is carried will be driven in a counter-clockwise direction. Thus it will be apparent that as the ram operates in its to and fro movement, the shaft 556 will be given intermittent rotary motion to feed the table from right to left or left to right, as the case may be, either by hand or automatically from the machine. It is to be understood that when the shaft 556 is rotated as heretofore described by a manual operation, the spider 600 is moved to an intermediate position in which it is shown in Figure 13. In this position neither of the gears 608 or 610 engages the gear 630 and therefore, the shaft 556 is free to be rotated by the handle 558.

Referring again to Figure 4, it will be noted that the work supporting bed 100 has a depending arm 632 which has a threaded opening for the reception of a threaded shaft 634. This shaft may be operated manually by a handle 636 and together with its threaded engagement with the arm 632, forms the means for moving the work supporting bed beneath the tools in a position at right angles to the automatic or machine driven feed of the bed in order that the work carried by the bed may be properly adjusted in this plane relative to the tools 102 and 104.

By reference to Figure 2, it will be noted that the work supporting bed may also be adjusted vertically of the machine and this is accomplished by means of a threaded bolt 640 threaded through a boss or the like 642 carried by the frame of the machine. The free end of this threaded bolt 640 engages a vertically sliding member 644, and this member 644 carries the track-way 552, heretofore mentioned. Thus, as the screw 640 is adjusted, see Figure 4, the entire work supporting bed may be raised or lowered, depending upon the direction of rotation imparted to said threaded bolt 640. By this construction and arrangement of parts the work may be adjusted either nearer to or further from the tools 104 as the case may be.

As thus far described, the machine operates in the following manner. The motor 84 being energized, as heretofore described, drives the shaft 78 which, as heretofore described, drives the gear 68 to move the ram to and fro over the work supporting bed. Simultaneous with this operation, with the motor 148 energized, through the medium of the belt train, heretofore described, each of the tools 102 and 104 will be driven. As the machine continues to operate, the tools will remain out of engagement with the work until such time as an opening in the tape 340 passes between the rollers 342 and 296 in the switch 290. If this occurs at a time when the ram is upon its outward movement, the solenoid of the tool 104 will be energized. Energization of the coil D of this tool will force the said tool into engagement with the work. Inasmuch as the action of a solenoid of this type is rather rapid and to prevent engagement of the tool with the work under impact, the piston 184 as it moves to close the port 190 of the tool 104 will compress air beneath the piston, and this compression of air below the port 190 in Figure 11 acts as a cushion to retard the downward movement of the tool sufficient to prevent damage to the tool or the work. Obviously, if this action takes place on the inward movement of the ram, the tool 102 will be moved into engagement with the work.

It will be obvious from the foregoing that each time the ram moves inwardly, both of the chains 480 and 560 will be operated, as heretofore described, thus providing for taking up the slack in the tape 340 and also for feeding the work transversely of the machine so that a working surface will, from time to time, be intermittently subjected to the action of either of the tools.

In order to make the machine completely automatic in its operation, I provide means for perforating or forming the openings in the tape 340, and this perforating mechanism is automatically controlled by surface conditions upon the surface of the work being operated upon by the machine and I will now proceed to describe the manner in which this is accomplished.

As far as the machine and its operation have been described, the machine is controlled by the perforated tape 340 and so far as described, this tape would necessarily have to be a preformed tape.

However, for the most successful operation of the machine, I prefer to perforate the tape 340 directly in the machine during the operation thereof and I will now proceed to describe the apparatus by, and the manner in which this is accomplished.

When the conductors 204 and 208 are energized by closing the switch 200 as heretofore described, the current passes through a step down transformer 700, see Figure 18, from which it passes through two conductors 702 and 704 to two illuminating devices 706 and 708 supplying current thereto sufficient for the illumination thereof. The light beam from these illuminating devices are projected through suitable conveyors 710 directly upon the work being operated upon, as illustrated diagrammatically in said Figure 18.

The reference numerals 712 and 714 designate two light responsive devices preferably in the form of photoelectric cells, the light sensitive device 712 being associated with the illuminating device 706, the light sensitive device 714 being associated with the illuminating device 708. Leading from the light sensitive device 712 there are two conductors 716 and 718 which are electrically connected to an amplifier 720, and leading from the light sensitive device 714 there are two conductors 722 and 724 which lead to an amplifier 726. The amplifiers 720 and 726 are electrically connected by two conductors 728 and 730. Power or current is supplied to the conductors 728 and 730 by means of the conductor 252, heretofore mentioned, which is connected as at 732 to the conductor 728 and a conductor 734 which is connected as at 736 to the conductor 208 and as at 738 to the conductor 730. Associated with the amplifier 720 there is a relay 740 and associated with the amplifier 726 there is a relay 742. The terminal 744 of the relay 740 is connected by a conductor 746 to the point 748 on the conductor 200. The terminal 750 of the relay 742 is connected by a conductor 752 to the point 754 upon the conductor 314. The switch lever 756 of the relay 740 is electrically connected with a conductor 758 which leads from the switch lever 760 of the relay 742 as at 762. The conductor 758 is connected to one of the elements 764 of a make and break device, and leading from this conductor 758 at the point 756 there is a conductor 758 which passes through a condenser 770 and through a solenoid 771. From the solenoid 771 the conductor 768 leads to and connects with the line 302 at the point 300, heretofore mentioned. The reference numeral 721 designates the other member of the make and break device and serves, when engaging the member 764, to complete a circuit between the conductors 758 and 768 which passes around the condenser 770 and when disengaged therefrom, serves to break this circuit. The members 764 and 721 are preferably of a resilient nature and normally tend to electrically contact each other. The armature 723 of the solenoid 771 carries an operating member 725 which is adapted to engage the member 721 when the armature is energized and move it out of engagement with the member 764 to break this circuit. This member 725 will, when the solenoid 771 is de-energized be moved by the armature 723 which, in turn, is operated by a spring 727 which is placed under compression when the solenoid 771 is energized.

The solenoid 771 is carried in a suitable housing 729, see Figure 9, and is located directly above the anvil 352, heretofore mentioned. The lower end 731 of the armature 723 is in the form of a punch which cooperates with the anvil 352 to perforate the tape 340 as it passes over the anvil 352.

From the foregoing it will be readily apparent that the intermittent breaking and establishing of the solenoid circuit by the make and break device will cause rapid intermittent operation of the punch 731 to perforate the tape 340 as it passes over the anvil, and this reciprocation will be of such rapidity as to form a continuous slot in the tape rather than a plurality of spaced perforations.

From the foregoing description it will be apparent that the circuit of the solenoid 771 may be energized by either the relay 740 or the relay 742.

By reference to Figure 11 it will be noted that the light sensitive device 712 is associated with the tool 104 and that the light sensitive device 714 is associated with the tool 102. By this arrangement of parts it will be obvious that when the light sensitive device 712 is energized, the tool 104 will be placed in operation, and when the light sensitive device 714 is energized, the tool 102 will be placed in operation. This is accomplished in the following manner. As the tools and light sensitive devices are passed over the work upon the work supporting bed and the color or other surface condition to which the light sensitive device 712 is responsive passes into the range of vision of said light sensitive device, the light sensitive device 712 energizes the relay 740, closes the circuit to the solenoid 771 and causes the perforating punch to perforate tape 340 as it passes over the anvil 352. It will be noted that the light sensitive device 712 is arranged in advance of the tool 104. It will also be noted that the tape 340 is perforated in advance of the control switch 290. Therefore, the tool 104 will not be placed in operation immediately the light responsive device 712 is effected by the surface conditions upon the work, since there will be an interval of time between the formation of the perforation in the tape 340 at the anvil 352 and the passage of the perforation between the contact members of the switch 290 and this interval of time will correspond to the interval of time between the picking up of the color by the light sensitive device 712 and the arrival of the tool 104 at the place where it is to begin operation. By reference to Figure 9 it will be noted that the interval of time elapsing during the passage of the perforation of the tape from the perforating tool 731 to the contacts of the control switch 290 may be adjusted so that it will correspond to the interval of time between the picking up of the color by the light sensitive devices and the engagement of the tool with the work, and this is accomplished by mounting the roller 356, heretofore mentioned, upon a plate 741 which is mounted to move about the shaft 743 upon which the roller 286, heretofore mentioned, is mounted. This plate 741 has an arcuate slot 745 and this slot 745 is adapted to receive a screw 747 carried by a suitable part of the machine. Thus, by loosening the screw 747 the plate 741 may be rocked about the shaft 743 to cause the roller 356 to form a loop 751 in the tape which may be of a greater or lesser degree, as desired, and which lengthens or shortens, depending upon adjustment, the path of travel of the tape between the perforating tool 731 and the contacts of the control switch 290.

While I have described only the operation of the light sensitive device 712 and its association with its respective tool 104, it is to be understood that the light sensitive device 714 is associated with the tool 102 and operates in the same manner as described in connection with the light sensitive device 712.

It will be obvious that the light sensitive device of one tool cannot throw its tool in operation except when the tool is travelling in its operative direction, as heretofore described, since this is prevented by the operation of the double throw switch 240.

To render the machine more accurate in its operation, it is desired to remove from the surface of the work at least within the range of the light sensitive device, the metal removed by the tools 102 and 104. While this may be accomplished in any desired manner I prefer to associate with each tool a relatively small pipe 251 which is adapted to project a blast of air in advance of the tool and its respective light responsive device to blow all particles of metal or foreign matter off the surface of the work being operated upon, thereby to insure accurate operation of the light sensitive devices. Air under pressure may be supplied to these tubes 251 in any desired manner and I have, therefore, not shown any specific air system coupled therewith.

Having thus described the invention, what is claimed as new, is:

1. In a machine of the type described, a work supporting bed, a plurality of tools movable over said bed, and means for singly and alternately engaging said tools with a piece of work mounted on said bed.

2. In a machine of the type described, a work supporting bed, a plurality of tools movable over said bed, and means responsive to conditions upon the surface of a piece of work mounted upon said bed for causing said tools alternately to engage a piece of work mounted on said bed.

3. In a machine of the type described, a work supporting bed, a plurality of tools movable over said bed, means normally holding said tools out of engagement with a piece of work mounted upon said bed, and means responsive to conditions upon the surface of a piece of work mounted upon said bed for causing individual engagement of said tools with a piece of work mounted on said bed.

4. In a machine of the type described, a work supporting bed, a pair of routing tools, means for supporting said routing tools above the bed, means for moving said tool supporting means to and fro across the bed, and means for alternately effecting engagement of said routing tools with a piece of work carried by the bed as the direction of travel of the tool supporting means changes.

5. In a machine of the type described, a work supporting bed, a pair of routing tools, means for supporting said routing tools above the bed, means for moving said tool supporting means to and fro across the bed, means for controlling the routing tools to effect alternate engagement thereof with a piece of work carried by the bed as the direction of travel of the tool supporting means changes, and means for rendering said routing tool controlling means inoperative.

6. In a machine of the type described, a work supporting bed, a pair of routing tools, means for supporting said routing tools above the bed, means for moving the tool supporting means to and fro across the bed, means for controlling the routing tools to effect alternate engagement thereof with a piece of work carried by the bed as the direction of travel of the tool supporting means changes, and means for rendering the routing tool controlling means alternately inoperative.

7. In a machine of the type described, a work supporting bed, a pair of routing tools, means for supporting said routing tools above the bed, means for moving the tool supporting means to and fro across the bed, electrical means responsive to surface conditions upon the surface of a piece of work supported upon the bed to effect alternate engagement thereof with a piece of work carried by the bed as the direction of travel of the tool supporting means changes, and means for rendering the electrical routing tool controlling means alternately inoperative regardless of surface conditions upon the surface of the work.

8. In a machine of the type described, a work supporting bed, a pair of routing tools, means for supporting said routing tools above the bed, means for moving the tool supporting means to and fro across the bed, electrical means responsive to surface conditions upon the surface of a piece of work supported upon the bed to effect alternate engagement thereof with a piece of work carried by the bed as the direction of travel of the tool supporting means changes, and means operated by the routing tool supporting means for rendering the electrical routing tool controlling means alternately inoperative regardless of surface conditions upon the surface of the work.

9. In a machine of the type described, a work supporting bed, a plurality of routing tools, a single tool support for supporting said tools in operative position relatively to the bed, means common to each tool for effecting operative engagement of the tool with a piece of work supported upon the bed, and means for directing a blast of air upon the surface of the work directly in advance of each tool when it is in operative engagement with the work upon the bed.

10. In a machine of the type described, a work supporting bed, a plurality of routing tools, a single tool support for supporting said tools in operative position relatively to the bed, means common to each tool for effecting operative engagement of the tool with a piece of work supported upon the bed, and means individual to each of said routing tools for directing a blast of air upon the surface of the work directly in advance of the tool when it is in operative engagement with the work upon the bed.

11. In a machine of the type described, a work supporting bed, a plurality of routing tools, a single tool support for supporting said tools in operative position relatively to the bed, means commmon to each tool for effecting operative engagement of the tool with a piece of work supported upon the bed, and means individual to each of said routing tools for directing a blast of air upon the surface of the work directly in advance of the tool when it is in operative engagement with the work upon the bed, and means for cutting off the air blast at each tool as it is moved out of operative engagement with the work on the bed.

12. In a machine of the type described, a work supporting bed, a plurality of routing tools, means for carrying said routing tools and moving them relatively to a piece of work mounted on said bed, means for normally holding said routing tools out of engagement with a piece of work on the bed, and separate means operative to force said tools into operative engagement with said work against the action of said first mentioned means.

13. In a machine of the type described, a work supporting bed, a plurality of routing tools, means for carrying said routing tools and moving them relatively to a piece of work mounted upon said bed, mechanical means for normally holding said routing tools out of engagement with a piece of work on the bed, and electrical means for moving said tools into operative engagement with said work.

14. In a machine of the type described, a work supporting bed, a plurality of routing tools, means for carrying said routing tools and moving them relatively to a piece of work mounted upon said bed, mechanical means for normally holding said routing tools out of engagement with a piece of work on the bed, electrical means for moving said tools into operative engagement with said work against the action of said mechanical means.

15. In a machine of the type described, a work supporting bed, a plurality of routing tools, means for carrying said routing tools and moving them relatively to a piece of work mounted upon said bed, mechanical means for normally holding said routing tools out of engagement with a piece of work on the bed, electrical means for moving said tools into operative engagement with said work against the action of said mechanical means, said last mentioned means being responsive to surface conditions upon the surface of the work on the bed.

16. In a machine of the type described, in combination, electrical means for determining operative engagement and disengagement of a tool with a piece of work to be operated upon, electrical circuits for said electrical means, a timing mechanism for controlling said circuits, and means responsive to surface conditions upon the work being operated upon for controlling said timing mechanism.

17. In a machine of the type described in combination, electrical means for determining operative engagement and disengagement of a tool with a piece of work to be operated upon, electrical circuits for said electrical means, said circuits including a switch, a timing mechanism including a perforated tape for operating the afore-mentioned switch, means for perforating said tape, and means for operating said tape perforating means.

18. In a machine of the type described in combination, electrical means for determining operative engagement and disengagement of a tool with a piece of work to be operated upon, electrical circuits for said electrical means, said circuits including a switch, a timing mechanism including a perforated tape for operating the afore-mentioned switch, means for perforating said tape, and means for operating said tape perforating means, said last mentioned means including photo-electric cells responsive to surface conditions upon the surface of a piece of work being operated upon.

19. In a machine of the type described in combination, a work supporting bed, a tool, means for supporting and moving said tool to and fro over a piece of work to be operated upon and supported upon said bed, electrical means for determining operative engagement and disengagement of said tool and the work, and means for controlling the operation of said electrical means, said controlling means including a photo-electric cell mounted in advance of the tool and in spaced relation therewith, and a timing mechanism interposed between the photo-electric cell and the electrical means for determining the operative engagement and disengagement of the tool with the work.

JACOB SHILKOFF.
CLARENCE P. WOOD.